United States Patent
Bijani et al.

(10) Patent No.: US 10,255,081 B2
(45) Date of Patent: Apr. 9, 2019

(54) METHOD AND SYSTEM FOR INTELLIGENT CLOUD PLANNING AND DECOMMISSIONING

(71) Applicant: Accenture Global Solutions Limited, Dublin (IE)

(72) Inventors: Pramod Bijani, Mumbai (IN); Ravi Sachdev, Mumbai (IN); Mahesh Bandkar, Mumbai (IN); Ashok Gopinath, Bangalore (IN); Anand Govind Parulkar, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 287 days.

(21) Appl. No.: 15/212,285

(22) Filed: Jul. 17, 2016

(65) Prior Publication Data

US 2017/0017505 A1    Jan. 19, 2017

(30) Foreign Application Priority Data

Jul. 17, 2015  (IN) ............................ 3678/CHE/2015

(51) Int. Cl.
   *G06F 9/445*   (2018.01)
   *G06Q 10/00*   (2012.01)

(52) U.S. Cl.
   CPC ...... *G06F 9/44505* (2013.01); *G06F 9/44594* (2013.01); *G06Q 10/00* (2013.01); *G06Q 10/20* (2013.01)

(58) Field of Classification Search
   CPC . G06F 9/44505; G06F 9/44594; G06Q 10/00; G06Q 10/20

USPC ........................................................ 709/226
See application file for complete search history.

(56) References Cited

U.S. PATENT DOCUMENTS

| 2009/0037896 | A1* | 2/2009 | Grechanik | ............... G06F 8/65 717/168 |
| 2010/0125473 | A1 | 5/2010 | Tung et al. | |
| 2011/0231229 | A1* | 9/2011 | Hadar | .................... G06Q 10/06 705/7.38 |

(Continued)

FOREIGN PATENT DOCUMENTS

EP    2808790 A2    12/2014

OTHER PUBLICATIONS

Office Action for Australian Application No. 2016206215, dated Aug. 16, 2016.

(Continued)

*Primary Examiner* — James E Springer
(74) *Attorney, Agent, or Firm* — Brinks Gilson & Lione

(57) ABSTRACT

A method for decommissioning an application operating on a computer system or a computer system includes receiving, at a decommissioning system, information that specifies a server to analyze. The decommissioning system determines one or more applications operating on the server, one or more instruction code libraries that are being utilized by the one or more applications, and hardware dependencies of the one or more instruction code libraries. Based on the determined hardware dependencies, the decommissioning system determines whether the application is suitable for migration to a cloud computing system. The decommissioning system generates a report indicating a suitability for migration of the application to the cloud computer system.

24 Claims, 13 Drawing Sheets

(56) References Cited

U.S. PATENT DOCUMENTS

| | | | |
|---|---|---|---|
| 2012/0137001 A1* | 5/2012 | Ferris | H04L 67/16 709/226 |
| 2014/0040880 A1 | 2/2014 | Brownlow et al. | |
| 2014/0122577 A1 | 5/2014 | Balasubramanian | |
| 2014/0279201 A1* | 9/2014 | Iyoob | G06Q 30/0631 705/26.7 |
| 2014/0280946 A1* | 9/2014 | Mukherjee | H04L 67/16 709/226 |
| 2014/0359129 A1 | 12/2014 | Sharma et al. | |
| 2015/0020061 A1* | 1/2015 | Ravi | G06F 8/65 717/172 |
| 2015/0341240 A1* | 11/2015 | Iyoob | H04L 43/08 709/201 |
| 2016/0034277 A1* | 2/2016 | Syed | G06F 9/541 717/136 |
| 2016/0261471 A1* | 9/2016 | Arora | H04L 43/045 |

OTHER PUBLICATIONS

Search Report for European Application No. 16179933, Completed Nov. 22, 2016.
Examination Report No. 1 in Australian Application No. 2017210624 dated Jun. 28, 2018, pp. 1-17.

* cited by examiner

METHOD AND SYSTEM FOR INTELLIGENT CLOUD PLANNING AND DECOMMISSIONING

RELATED APPLICATIONS

This application claims priority under 35 U.S.C. § 119 to Indian Application No. 3678/CHE/2015, filed Jul. 17, 2015, the contents of which are hereby incorporated by reference in their entirety.

BACKGROUND

Field

This application generally relates to computer system maintenance. In particular, this application describes a method and system for decommissioning a computer system and for deploying applications and the associated data of the computer system to a cloud computing infrastructure as deemed appropriate based on detailed analysis.

Description of Related Art

Decommissioning of a computer system is a process that involves shutting down applications and other assets operating on the computer system that no longer serve a beneficial purpose. For example, the computer system may be obsolete, too expensive to operate, etc. Because the system maintenance consumes a significant amount of resources, the decommissioning of the system may improve the overall system efficiency by reducing the use of software, hardware and other system resources.

However, the process for decommissioning an application on a computer system or the computer system itself system may pose significant risks and challenges, and technical solutions are needed for mitigating the risks and overcome the challenges that are encountered during the decommissioning process.

BRIEF SUMMARY

In one aspect, a method for decommissioning an application operating on a computer system or a computer system includes receiving, at a decommissioning system, information that specifies a server to analyze. The decommissioning system determines a target application operating on the server, then compares properties of the target application to properties associated with a plurality of applications to determine a relatedness of the target application to the different applications. Each of the plurality applications is associated with cloud deployment information. When the relatedness between at least one of the plurality of applications and the target application exceeds a threshold, the decommissioning system determines that the target application is related to the at least one application of the plurality of applications. The decommissioning system then generates a recommendation report to recommend that the target application be deployed to a cloud computing system according to the cloud deployment information associated with the at least one application of the plurality of applications.

In a second aspect, a system for decommissioning an application operating on a computer system or a computer system includes non-transitory computer readable media with instruction code; and a processor. Based on the instruction code, the processor is configured to receive information that specifies a server to analyze. The processor determines a target application operating on the server, then compares properties of the target application to properties associated with a plurality of applications to determine a relatedness of the target application to the different applications. Each of the plurality applications is associated with cloud deployment information. When the relatedness between at least one of the plurality of applications and the target application exceeds a threshold, the processor determines that the target application is related to the at least one application of the plurality of applications. The processor then generates a recommendation report to recommend that the target application be deployed to a cloud computing system according to the cloud deployment information associated with the at least one application of the plurality of applications In a third aspect, a non-transitory computer readable medium is provided that has instruction code stored thereon for decommissioning an application operating on a computer system or a computer system. The instruction code is executable by a machine for causing the machine to perform acts including receiving information that specifies a server to analyze, determining a target application operating on the server. The instruction code is further executable to cause the machine to compare properties of the target application to properties associated with a plurality of applications to determine a relatedness of the target application to the plurality of applications. Each of the plurality applications is associated with cloud deployment information. When the relatedness between at least one of the plurality of applications and the target application exceeds a threshold, the instruction code is further executable to cause the machine to determine that the at least on application is related to the at least one application of the plurality of applications; and generate a recommendation report to recommend that the target application be deployed to a cloud computing system according to the cloud deployment information associated with the at least one application of the plurality of applications.

DETAILED DESCRIPTION

The embodiments described in this application put into play intelligent decision making through data and analytics to achieve simplification of IT estate by accelerating cloud adoption through selection of the right cloud model & solution using artificial intelligence and thereby decommissioning applications, processes and data centers and their associated Infrastructure. For this, the tool is trained extensively using algorithms and data gathered from past experiences to detect opportunities for cloud adoption and decommissioning and then use DevOps techniques to automate potential cloud deployments. Using artificial intelligence, the embodiments detect applications that are candidates for decommissioning owing to low business value or duplication. The embodiments automate the selection of the deployment topology on the selected cloud solution again using artificial intelligence by providing a set of relevant videos from guidance and matching images captured from videos automatically to deployment templates. The embodiments also automate the deployment of the application on a choice of cloud solutions by generating DevOps scripts. The embodiments automate the creation of the business case for migrating applications based on the cloud solution selected and based on the number of applications or servers decommissioned. The embodiments also track the decommissioning process and provide metrics around the same. The embodiments also comprises of a built in virtual assistance so that users can get their questions answered over a voice based interaction that will be responded to by a virtual agent instead of a human being.

Other features of the application relate to creation of a business case. For example, embodiments of the application automatically compute the target state TCO of the application and generate a comparison against a current spend baseline. The embodiments automate the simulation of what simplification will result post the implementation of the recommendations in terms of decommissioned applications or servers and data centers as a result of cloud adoption. The embodiments thereby provide the savings business case as a result of the intelligent decision making process.

Other aspects disclosed relate to tracking of IT estate. For example, the embodiments provide analytics on how a user may be tracking to the business case by tracking the status of the applications post deployment i.e. whether their data is migrated and whether they have been switched off.

As used herein, the term "decommissioning" generally means deactivating an application on a computing infrastructure in a data center and possibly moving the application to a cloud system as one of the possible enhancement models. When all the applications at a given data center are deactivated at a given data center, the datacenter itself may be deactivated (i.e., computers sold, etc.). Thus "decommissioning" may also refer to the deactivating of the entire data center.

Figure 1:
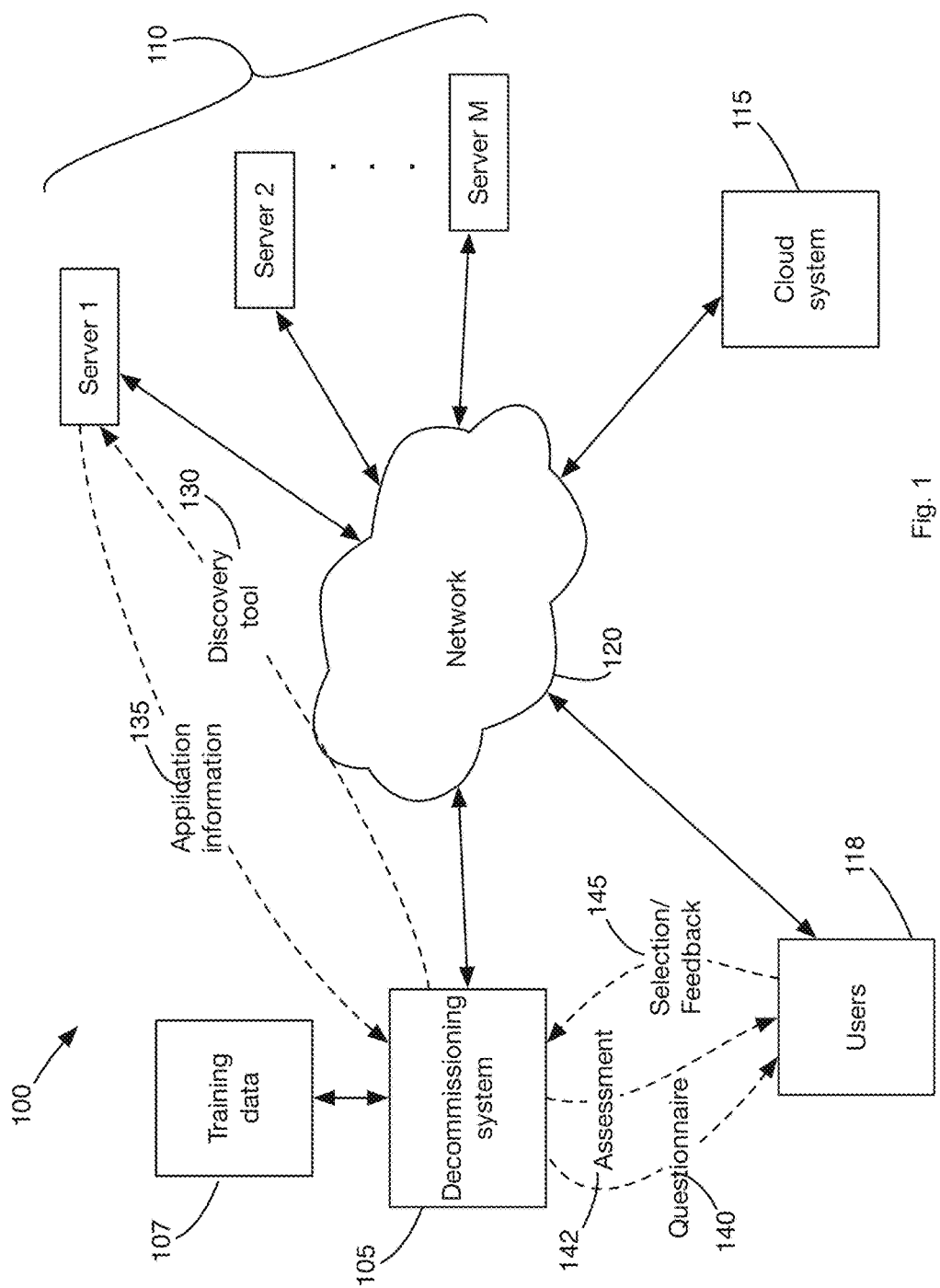
FIG. 1 illustrates an exemplary environment for decommissioning a production computer system.

FIG. 1 illustrates an exemplary environment 100 for decommissioning a production computer system. Illustrated are a decommissioning system 105, a group of servers 110, and a cloud computing system 115. The various systems and servers may be in communication with one another via a network 120, such as the Internet.

The cloud computing system 115 corresponds to a collection of computing resources that may be shared by various entities. For example, computer processors, mass storage devices, network infrastructure, etc. may be shared by different companies. The cloud computing system 115 is generally setup in such that a given company only has access to its own data and applications.

The cloud computing system 115 may be maintained by dedicated IT personal who may be available 24/7 to deal with any issues of the cloud computing system 115. Companies that operate the cloud computing systems 115 typically charge fees for hosting applications. These fees may be used in part to improve the functioning of the cloud computing system from time-to-time by upgrading processors, increasing mass storage, improving network access, etc.

The servers 110, on the other hand, generally correspond to computers systems that may be located in-house and managed by a local IT group or an IT consultant. Applications operating on the servers 110 may include email applications, web server applications, various custom applications, etc.

In general, the decommissioning system 105 assesses whether an application operating on a given server 110 is suitable for migration to the cloud system 115, and assesses a cost benefit for doing so. The decommissioning system 105 is further capable of taking care of the steps necessary to deploy the application to the cloud system 115.

There are several reasons why it might make sense to move such applications to a cloud computing system 115. For one, constantly having to maintain a computer system can be costly. In some cases, IT personal have to be available 24/7 to be able to address unexpected emergencies. Having to upgrade hardware can be cost prohibitive for some companies. These are just some of the reasons why it may make sense to have applications hosted in a cloud computing system.

To support these aspects, the decommissioning system 105 deploys a discovery tool 130 to a server 110 applications. The discovery tool 130 includes modules for performing an analysis of the applications running on the server 110, an in turn transmits application information 135 back to the decommissioning system 105 regarding applications running on the server, their dependencies on other applications, and hardware utilized by the applications. The decommissioning system 105 then generates a report that includes assessment information 142 that indicates a given applications suitability for migration to the cloud system 115, cost benefit information for doing so, and details of the type of migration to perform.

The assessment information 142 is generally determined as follows: The decommissioning system 105 uses the application information 135 provided by the discovery tool 130 to classify the application. For example, the decommissioning system 105 searches a training data store 107 for previously assessed applications having similar properties similar to those of the application. Previously determined assessments associated with those applications are then utilized to form the basis of the assessment information 142 in the report.

The initial data provided in the training data store 107 is generated during a training phase. Subject matter experts (SMEs) having detailed knowledge of various applications determine whether an application is suitable for migration to the cloud system along with the type of template to utilize in migrating the application. Property information associated with those applications may have been previously obtained by the discovery tool. The results of the SME determinations and application properties are then related to one another in the training data store 107.

In a post training phase, a user 118 of the decommissioning system 105 can agree with the assessment information 142 provided by the decommissioning system or select different migration options. The choice made by the user 118 is utilized by decommissioning system 105 to update the information in the training data store 107. In this way, the decommissioning system 105 learns over time to make better assessments.

Figure 2:
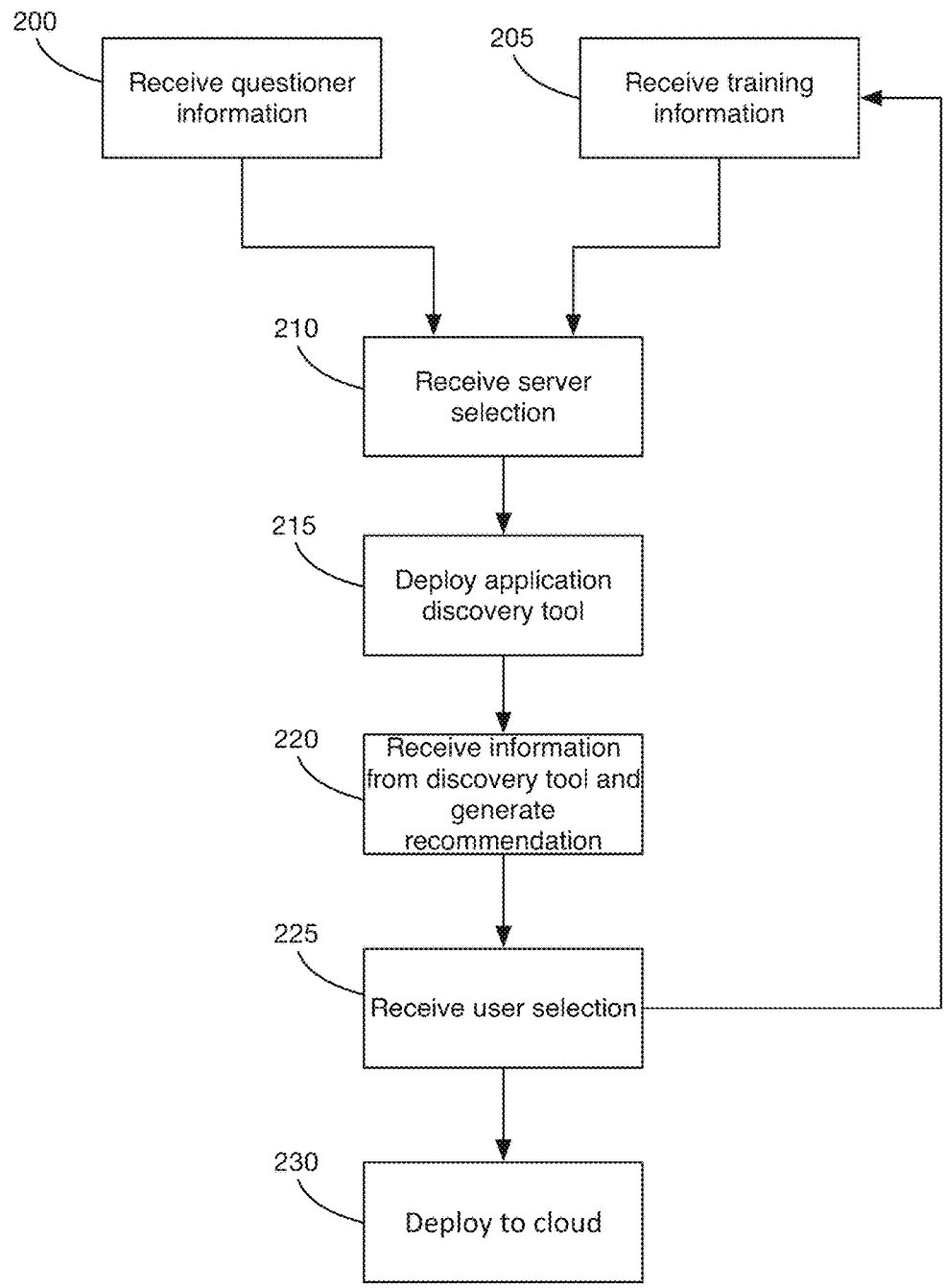
FIG. 2 illustrates various exemplary operations that may be performed by the decommissioning system in determining whether an application operating on a server should be decommissioned.
Figure 3:
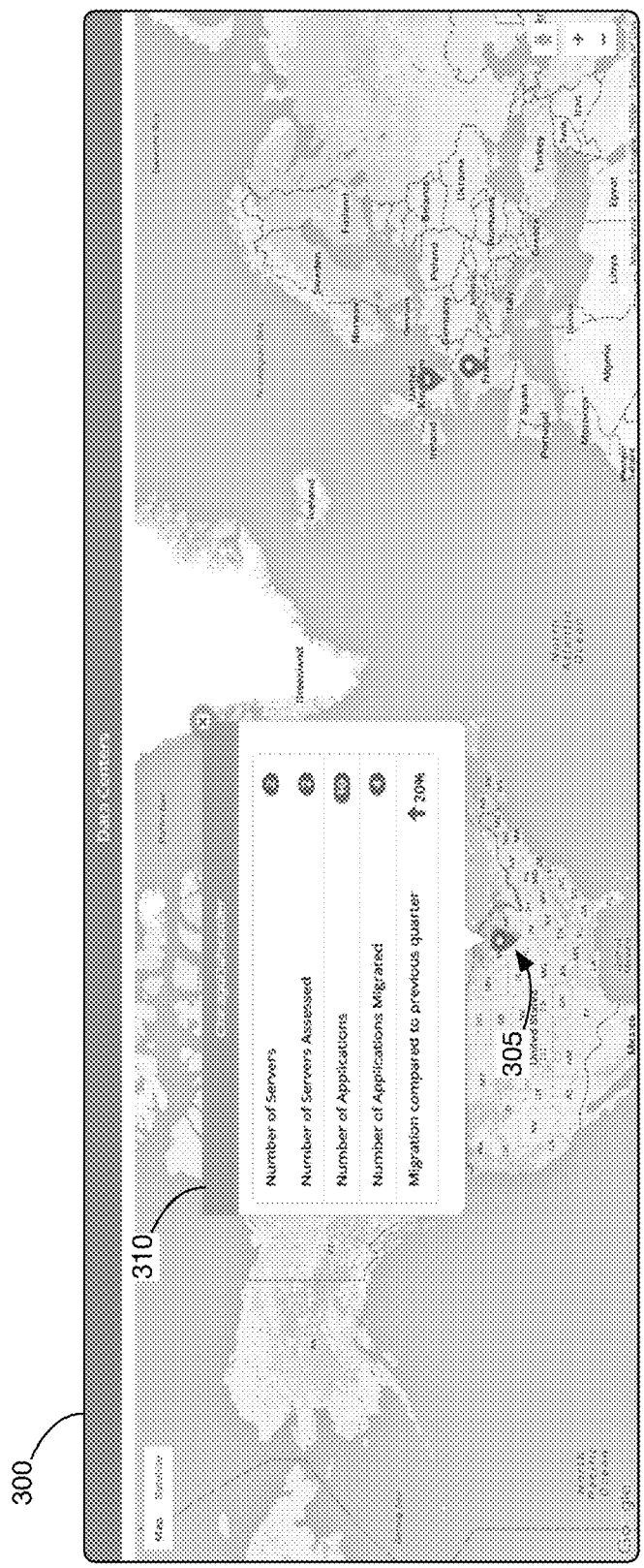
FIG. 3 illustrates an exemplary world map that indicates the geographic locations of various data centers to be decommissioned.

FIG. 2 illustrates various operations that may be performed by the decommissioning system 105 in determining whether an application operating on a server 110 should be decommissioned. The operations are better understood with references to the screenshots illustrated in FIGS. 3, 4, 6, and 7. It should be understood that the operations described below may be performed by one or more computer systems operating in cooperation with one another. In this regarding, the computer system may include non-transitory computer readable media such as RAM, ROM, and mass storage upon which instruction code for carrying out the operations may be stored.

Referring to FIG. 2, at block 200, the decommissioning system 105 may receive responses to questionnaires 140 regarding various aspects of the various applications operating on different servers 110 throughout a company from subject matter experts (SMEs) associated with the various applications. In this regard, the questionnaire 140 may have been delivered to the SMEs via web page or a different communication channel. In the case of a web page, after filling out of the questionnaire 140, the web page may be submitted back to the decommissioning system 105.

Questions in the questionnaires 140 may have asked the SMEs to provide a business value for each application, such as a money amount indicative of revenue generated by the application. The SMEs may have been asked to rank the value on a 1 to 10 scale, 1 indicating the lowest value. The business value may be expressed in a different manner. Other business level related questions may include those listed in Table 2 below.

The SMEs may have been asked to identify various dependencies of the applications. For example, the SMEs may have been asked whether there are other libraries, databases, etc. upon which a given application is dependent.

Table 1 below lists a subset of exemplary questions to which answers may have been provided by SMEs.

TABLE 1

Time to market
    What is application's primary business purpose?
    What geographic areas does the application service?
Migration costs
    What are the constraints/requirements with regard to budget and costs? Please explain.
Cost - opex savings
    H/w maintenance costs
    S/w maintenance costs
    Staffing - employees (includes dedicated help desk)
    Staffing - contractor
    Licensing/asp/maintenance fees
    Technical support staff training
    Admin costs
Cost - capex savings
    H/w costs
    Software licenses costs
Languages
    Programming languages & Framework"
    Tools/packages:
    Development and Debugging tools:

TABLE 1-continued

Test tools
    Defect tracking tools
    Front end technologies
    Middle-tier technologies
    Application Server
Databases & Data size
    Database type (e.g., Relational, Network, Hierarchical)
        Software vendor
        Product
        Version
        32-bit or 64-bit
Hardware Platform - For each server please provide the following information
    # of servers
    Hardware Vendor
    Hardware model/Type
    Function & purpose
    OS & versions
    Memory
    Storage size
    Internal/External storage
    Processors:
        #
        Vendor
        Type
        Speed At block 205, training information may be received at the decommissioning system 105. As noted above, the initial data provided in the training data store 107 is generated during a training phase. Subject matter experts (SMEs) having detailed knowledge of various applications determine whether an application is suitable for migration to the cloud system along with the type of template to utilize in migrating the application. The results of those determinations are stored in the training data store 107 and related to the application classification information that is in turn associated with the applications for which the SME's made a determination.

At block 210, the decommissioning system 105 may receive a selection of a server to analyze. For example, as illustrated in the exemplary screen shot 300 of FIG. 3, the decommissioning system 105 may generate a world map that indicates the geographic locations of various data centers. The screen shot 300 may be conveyed to a user of the decommissioning system 105 via a web server, terminal of the decommissioning system 105, etc.

The user 118 may select a first data center 305. The decommissioning system 105 may then display a dialog box 310 that lists information previously discovered about the first data center 305. Discovery of the information is described below. The previously discovered information may include, for example, the number of servers located at the data center, the number of servers that have been assessed by the decommissioning system 105, the total number of applications operating on the server, and the number of applications migrated to the cloud computing system 115. Other information related to the selected data center 305 may be listed.

Figure 4B:
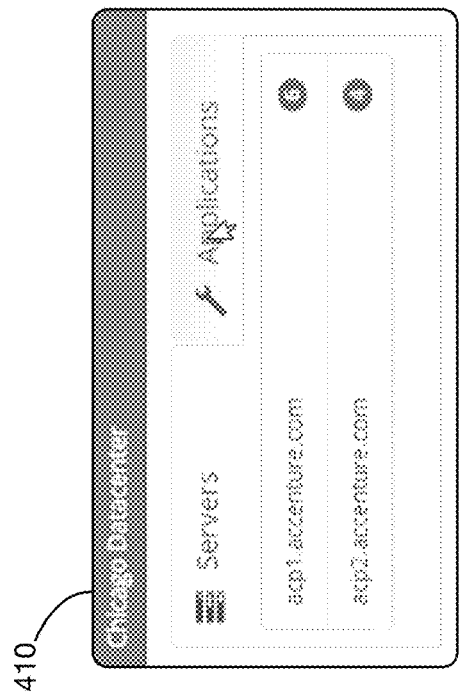
FIGS. 4A and 4B illustrate exemplary dialog boxes that may be displayed when a user selects a data center illustrated in FIG. 3.
Figure 4A:
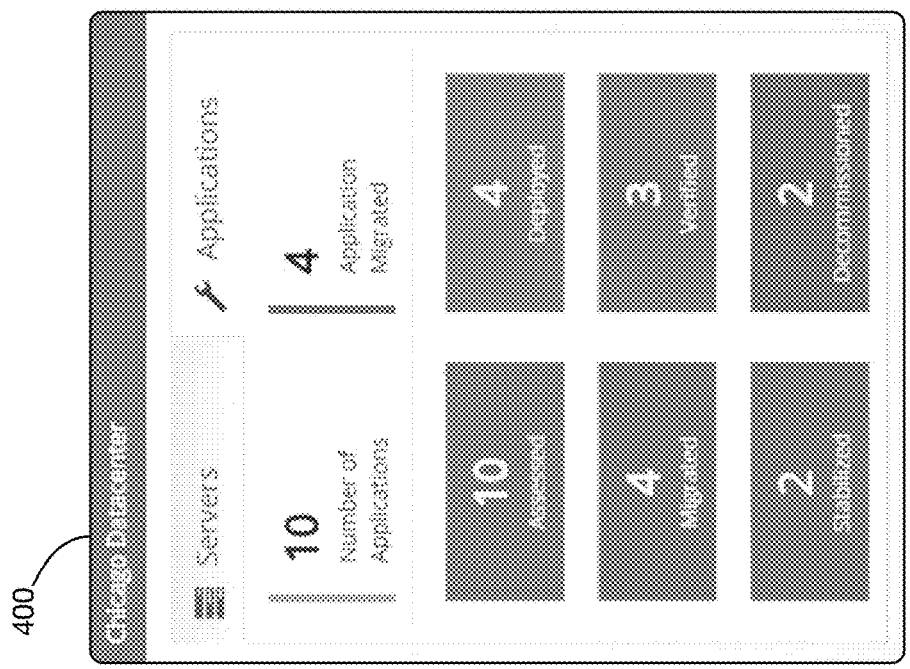

FIGS. 4A and 4B illustrate dialog boxes that may be displayed when the user selects a data center 305. In addition to the previously discovered information listed above, in FIG. 4A, the dialog box 400 displays the number of applications that have been stabilized, deployed, verified, and decommissioned. In this regard, being deployed indicates that the application is set up on the cloud but it's data is yet to be migrated. Being migrated indicates that the application has been set up on the cloud (i.e., deployed) and that the data associated with the application has been migrated. The number of decommissioned applications correspond to the number of applications in the data center than have been shut down and/or deployed to the cloud computing system 115.

The dialog box 410 of FIG. 4B lists the servers previously determined to be operating in the data center 305 along with the number of applications operating on each server.

Returning to FIG. 2, at block 215, the decommissioning system 105 may communicate a discovery tool 130 (FIG. 1) to the selected server and communicates an instruction to the server 110 to install the discovery tool 130 and to execute the discovery tool 130.

Figure 5:
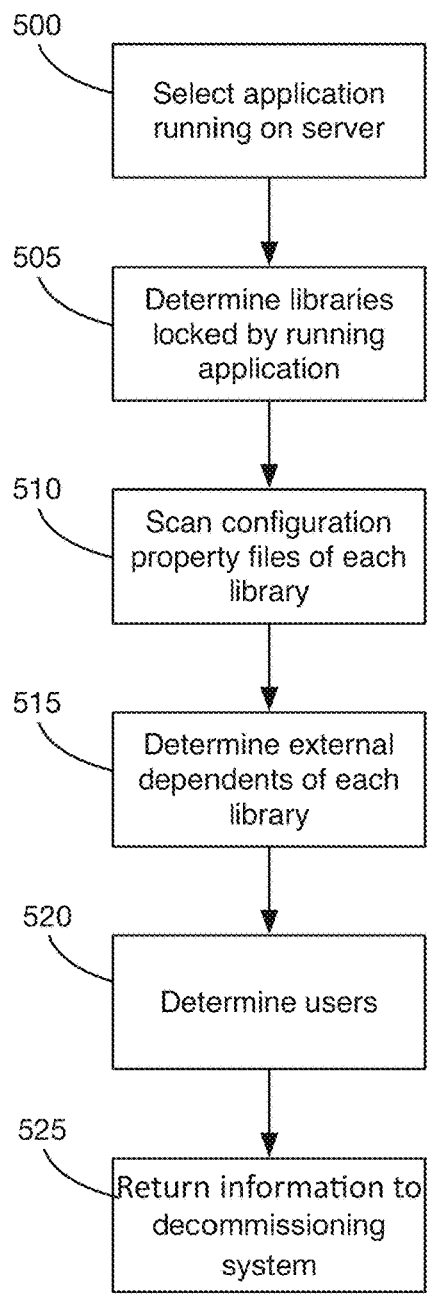
FIG. 5 illustrates exemplary operations that may be performed by a discovery tool of the decommissioning system.

The discovery tool 130 is configured to performing various types of analysis/operations, as illustrated in FIG. 5 for determining information related to applications running on a server 110. In general, the discovery tool 130 is configured to identify the processes that are running on the server 110 and from those processes, determine hardware component dependencies of the processes, dependencies of the processes on other applications, and application interfaces of the processes.

Referring to FIG. 5, at block 500, a first operation of the discovery tool 130 may determine the various processes and/or applications currently being executed on the server 110. For example, most mainstream operating systems such as Unix, Linux and Window OS have built in commands to locate processes/application, their packages, and dependent libraries. In one implementation, the discovery tool is built using Java JDK 1.8 and launches the appropriate OS system command to identify the information above, then uses built in functions of the Java API to read the packages and their contents. A mix Java functions and functions for parsing XML files may be utilized to determine dependencies of the applications by reading configuration files stored within the packages.

Other Information collected by the first module may include the amount of processor usage associated with a given application and/or a number of users that utilize the application. In this regard, the first module may be left to run on the server for a predetermined amount of time, such as a week, month, etc. to provide a better assessment as to the overall usage of the application.

Table 2 below illustrates information that may be determined by the first module.

TABLE 2

| Server | Application | Number of Users | % Processor usage |
| --- | --- | --- | --- |
| acp1.accenture.com | Mail app | 1000 | 20% |
| acp1.accenture.com | Webserver app | 10000 | 50% |
| acp1.accenture.com | Weather app | 10 | 2% |
| ... | ... | ... | ... |

According to Table 2, there are three applications running on a server at URL acp1.accenture.com. During the period of analysis, such as a month, 1000 different users utilized the mail application, 10000 utilized the webserver application, and 10 users utilized the weather application. The mail application utilized 20% of the processing power during the analysis period. The webserver application utilized 50%, and the weather application utilized 2%.

Referring to block 505, a second operation of the discovery tool 130 may locate and scan code repositories associated with each application to identify interfaces, reports, data access components, and conversion programs that are utilized by the application.

Referring to block 510, a third operation of the discovery tool 130 may determine any libraries that may be utilized by the applications identified above by scanning configuration property files associated with each library to determine whether a given library is utilized by a given application. For example, a given application may require functions defined in a code library. The third module may, therefore, determine that the application has a dependency on the library.

Referring to block 515, a fourth operation may determine any external dependencies of the applications. For example, a mail application may be connected to a data file that stores the emails of all the users of the mail application. The data file may be stored on a particular hard drive. Thus, the application may be determined to have a dependency on both the data base and the hard drive.

Referring to block 520, a fifth operation may locate a configuration management database (CMD) and may scan the CMD to determine the identities and emails of teams and individuals shown over time as having been given access to the applications. The rationale behind this is that the identified users 118 may have some level of interest in the application. It may, therefore, be necessary to contact these users prior decommissioning of the application or migrating the application to the cloud computing system 115.

At block 525, the discovery tool 130 may communicate application information 135 that summarizes the results of running the various modules above to the decommissioning system 105.

Returning to FIG. 2, at block 220, the decommissioning system 105 may receive the information 135 from the discovery tool 130 and generate a recommendation. For example, the properties of the application under evaluation, as determined by the discovery tool 130, may be compared with the properties of applications stored in the training data store 107. Applications in the training data store 107 having properties similar to those of the target application may be selected. The recommendations regarding whether to migrate those applications to the cloud, template types for deployment to use, etc., that were specified by the SME are retrieved and form the basis of the recommendation as to cloud migration, template type, etc. for the target application.

In particular, each application is scored on a set of attributes related to business value, technical fitment and risk/control/compliance information determined from the questionnaire 140. The application is given a rating of 1-5 for each attribute depending on the answers to the question. Algorithmic evaluations using classification algorithms (e.g., Native Bayes) are then performed to determine the recommendations. For example, the recommendation output regarding a business value for a particular application may be one of: strategic, invest, reduce, remove, wherein strategic corresponds to the highest value business value. A recommendation output regarding technical fitment for cloud may be one of: cloud native, cloud candidate, to-be-modernized, where cloud native indicates a high degree of suitability for deploying the application to the cloud system 115. A recommendation output regarding risk/compliance sensitivities may be one of: high, medium or low, wherein high indicates a high risk of compliance issues should the application be deployed to the cloud system 115.

The algorithms above may also be run on each dependency associated with the application determined by the discovery tool 130. Total cost of ownership data is collected on these applications including run and hosting costs from the questionnaire 140.

Based on the business value, technical fitment and risk/compliance sensitivities of the application as well as it's dependencies, an alternating least squares (ALS) algorithm is utilized to determine the recommended cloud model for the client as one of: SaaS, PaaS, and IaaS, and its cloud nativity as one of: public, private, and on premise. The user may be able to can override the recommendations in which case machine learning algorithms of the decommissioning system will record the override and subsequent recommendations will take into consideration the overrides that were made to re-evaluate whether there is a need to fine tune the recommendation.

Figure 6:
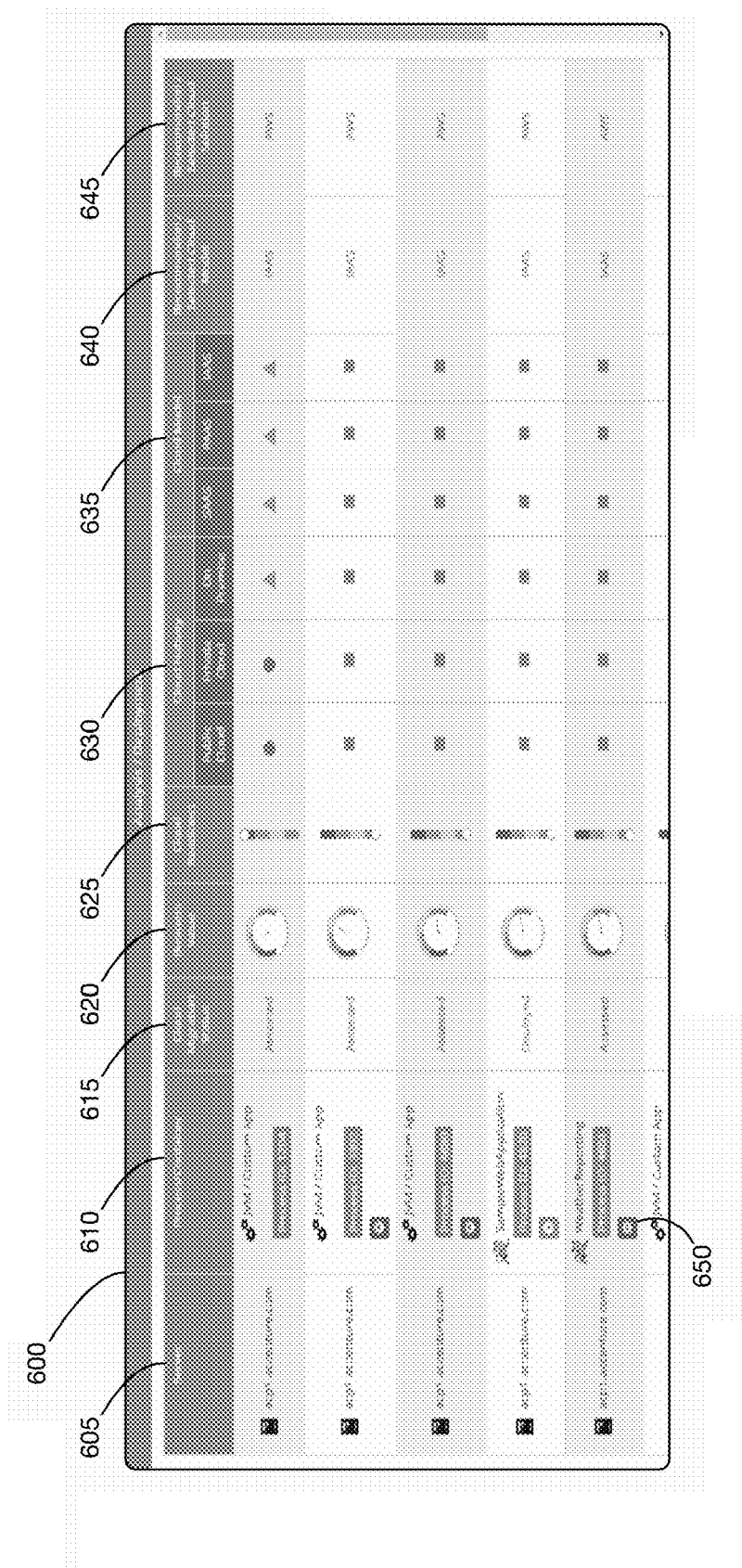
FIG. 6 illustrates an exemplary screen shot of an exemplary report that may be generated by the decommissioning system.

FIG. 6 illustrates a screen shot 600 that displays recommendations regarding several applications that may be generated by the decommissioning system 105. The first three columns (605, 610, and 615) indicate the name of the server that was analyzed, applications discovered on the server, and the migration status of each discovered application, respectively. A status of "Assessed" may indicate that the assessments described above have been performed, but that no other action has been taken. A status of "Deployed" may indicate that the application has been decommissioned on the named server and moved to the cloud computing system 115. While not illustrated, the status indicator may also indicate "Ready to Deploy" or something similar to indicate that the cloud computing system 115 is ready to receive the application to be deployed. The status indicator may also indicate "Decommissioned" or something similar to indicate that the application has been decommissioned, but not redeployed elsewhere. Other information may be provided in the status column 615.

A business value column 620 provides an indication of the potential cost savings that may be realized if the application was migrated using the recommended parameters. In this regard, the business value may be based on user 118 feedback provided in the questionnaire 140 regarding a given target application. For example, the SME for the target application may have indicated in the corresponding questioner that the total cost associated with operating the target application on the current server is $150000. On the other hand, operating the application in the cloud using the recommended provider, recommended template, etc. may be known to cost $80,000. Thus, a savings of $70,000 may be realized by migrating the application to the cloud.

A cloud readiness column 625 indicates the suitability for deploying a given application to the cloud computing system 115. For example, a website hosted on a server to be decommissioned may be easily ported to the cloud computing system 115. On the other hand, an application that requires intensive computing power (as indicated by its usage of the processor) (see Table 1) may be less suited to operating on the cloud computing system 115. In addition, applications that have a large number of dependencies on other systems that cannot for one reason or the other be deployed to the cloud may not be good candidates for cloud deployment.

A cloud nativity set of columns 630 indicates the suitability for the application operating within one of the following: A public cloud network in which case the network utilized by the application when operating in the cloud will be public; a private cloud network in which case the network utilized by the application when operating in the cloud will be a private network inaccessible to the public, on premise, which means the original data center at which the application is currently installed. Deployment on a public network may be selected, for example, when the application to be deployed is intended to be utilized by the general public. Deployment on a private network may be selected when the application to be deployed is intended to be utilized by, for example, personal within a corporation. Maintaining an application on premises may be selected when the application is not a candidate for deployment to the cloud for the reasons discussed earlier.

A cloud model set of columns 635 indicates whether the deployed application should be deployed as software as a service (SAAS), platform as a service (PAAS), and infrastructure as a service (IAAS). SAAS may be indicated for applications that require web based access as well as mobile access, such as an email application, CRM system, etc. PAAS may be indicated for applications that are utilized by developers to develop applications. IASS may be indicated for applications that require on demand access to servers, storage, network and operating systems.

A recommended/selected cloud model column 640 indicates the recommendation from the decommissioning system 105 as to which of the above models is preferable or a selection made be a user of the decommissioning system 105. As noted above, this recommendation is based on a comparison of the target application to applications in the training data store 107 for which a model was specified by an SME. Similarly, a recommended cloud solution column 604 indicates an automatic recommendation from the decommissioning system 105 as to a cloud solution to utilize or a selection made be a user of the decommissioning system 105. This recommendation is based on a comparison of the target application to applications in the training data store 107 for which a cloud solution was specified by an SME.

Referring back to FIG. 2, at block 225, the decommissioning system 105 may receive user selection. For example, each of the applications listed in the exemplary report may include a configuration button 650 that a user of the decommissioning system 105 may select to display a dialog box for selecting the type of deployment, as illustrated in FIG. 7A.

Figure 7A:
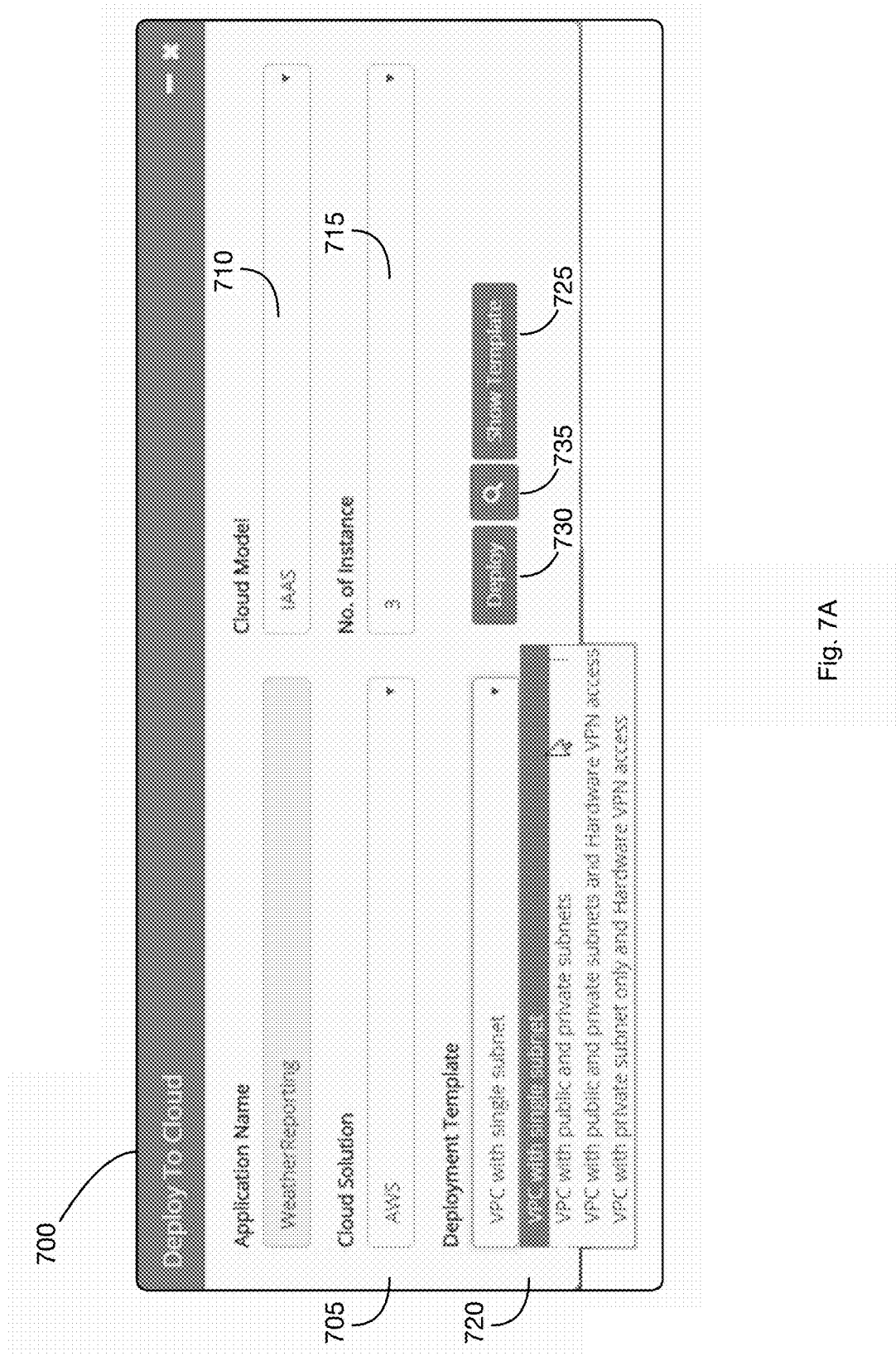
FIGS. 7A and 7B illustrate exemplary dialog boxes though which a user of the decommissioning system is allowed to select a type of cloud solution upon which to deploy an application.
Figure 7B:
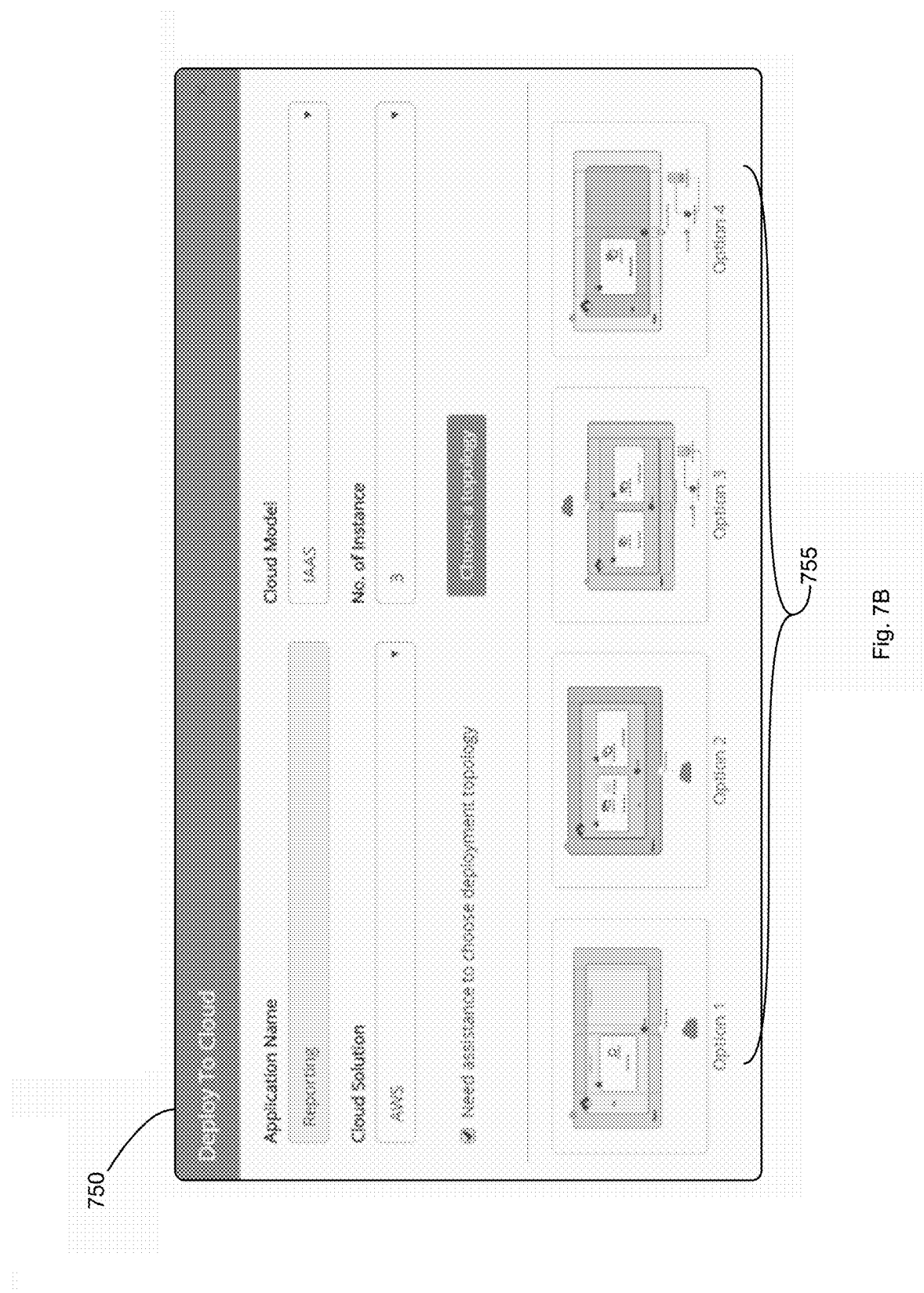

Referring to FIG. 7A, the dialog box 700 allows the user to select the type of cloud solution 705. For example, the user may select AWS, which corresponds to Amazon Web Services cloud computing service. The user may select the cloud model 710, such as IAAS. The user may specify the number of instances 715 of the application to deploy to the cloud computing system 115. For example, the user may specify that three instances of the application are to be deployed.

In addition, the user may specify a deployment template 720. In this regard, the deployment template may correspond to templates made available by the selected cloud solution provider. For example, in the case of AWS, the template choices include a VPC (virtual private computer) operating on a single network subnet, a VPC with both private and public network subnets, a VPC with both private and public network subnets and hardware VPN (virtual private network) access, and a VPC with only a private network subnet and hardware VPN access.

Figure 8:
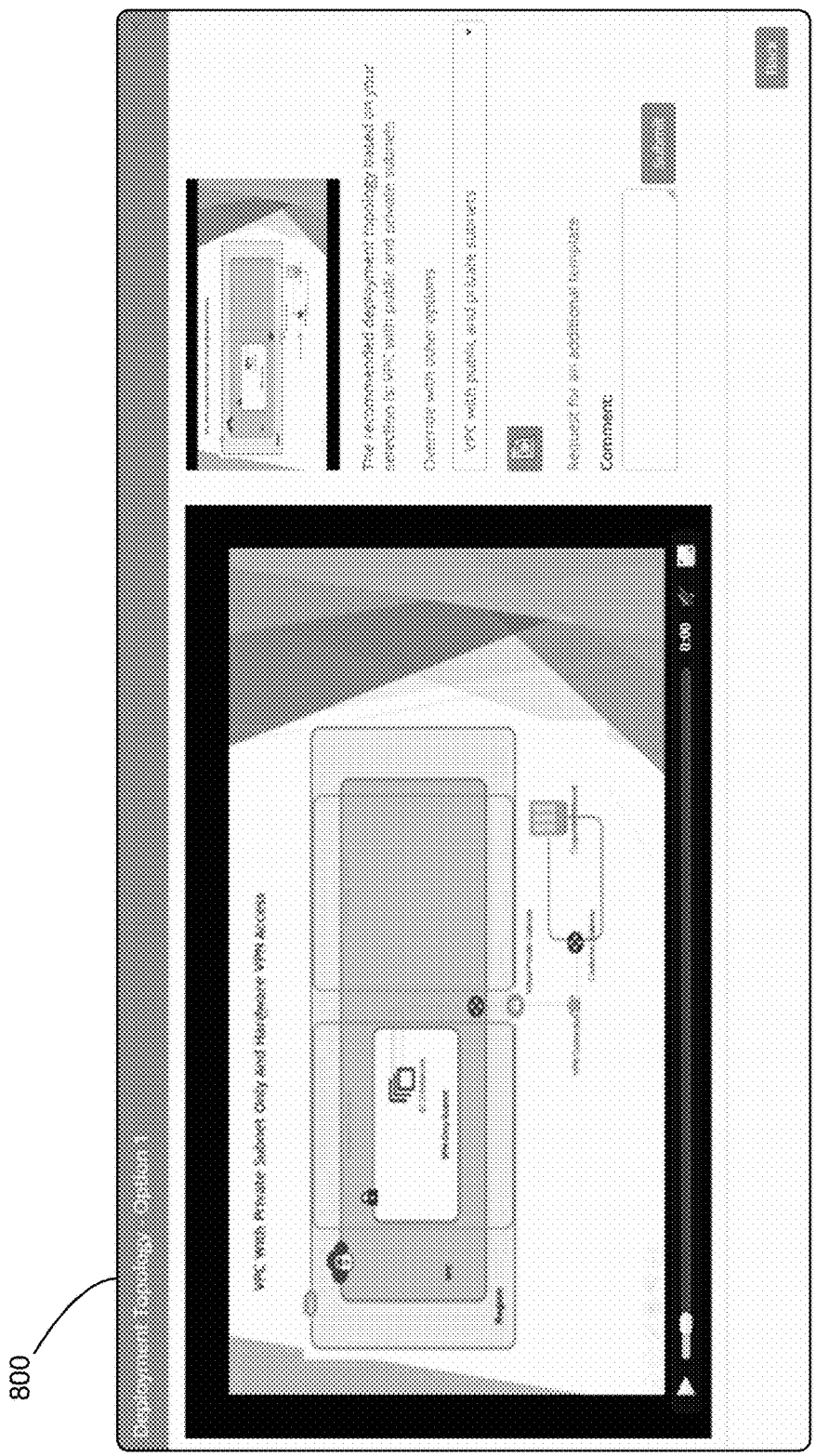
FIG. 8 illustrates an exemplary dialog box for activating a short video that describes various topologies associated with the deployment of cloud computing template options.

In the dialog box 700 of FIG. 8, the template choices are presented by way of a drop down list. As illustrated in the dialog box 750 of FIG. 7B, in an alternative implementation, graphical depictions 755 of the network topologies corresponding to the template choices described above may be provided. The graphical depictions 755 allow the user to visualize the network topology, which in some cases may be easier to understand for the user. The user may select a template topology by selecting one of the graphical depictions 755.

In some implementations, a "Show Template" button 725 may be provided on the dialog box 700 for activating a short video that describes the various topologies associated with the deployment template options, as illustrated in FIG. 8.

Referring to FIG. 8, the video may present each of the template choices provided by the cloud system provided. In this regard, the video may correspond to a series of tutorial clips. Each clip may have been prepared by an SME. The SME may narrate on the clip describing the merits of a particular template/toplogy for implementing a cloud solution. The clip may describe the features of each template and provide some guidance as to the types of applications best suited for a particular template. This in turn helps the user of the decommissioning system 105 determine whether a particular template is more suitable than another.

In some implementations, the dialog box displaying the video is configured to detect a user click of the video during video playback. In response, the decommissioning system 105 will attempt to determine the actual template offered by the cloud service provider that is associated with the template being discussed in the video clip. In this regard, machine learning algorithms, similar to those discussed above, may be utilized to relate the clip to a particular cloud provided template. That is, during an initial phase, training information may have been provided to make the associations. Then, during use, feedback based on user interaction with the system may be utilized to improve the accuracy of the training data.

In addition, various graphics comparison routines may be utilized to determine whether a template being illustrated in a video clip matches a topology choice of the cloud provided. For example, various Java Advanced Imaging API image comparison functions may be utilized to compare the video clip image to topology images provided by the cloud service provider to determine a topology/template of the cloud service provider that matches the one being discussed in the video clip.

Figure 9:
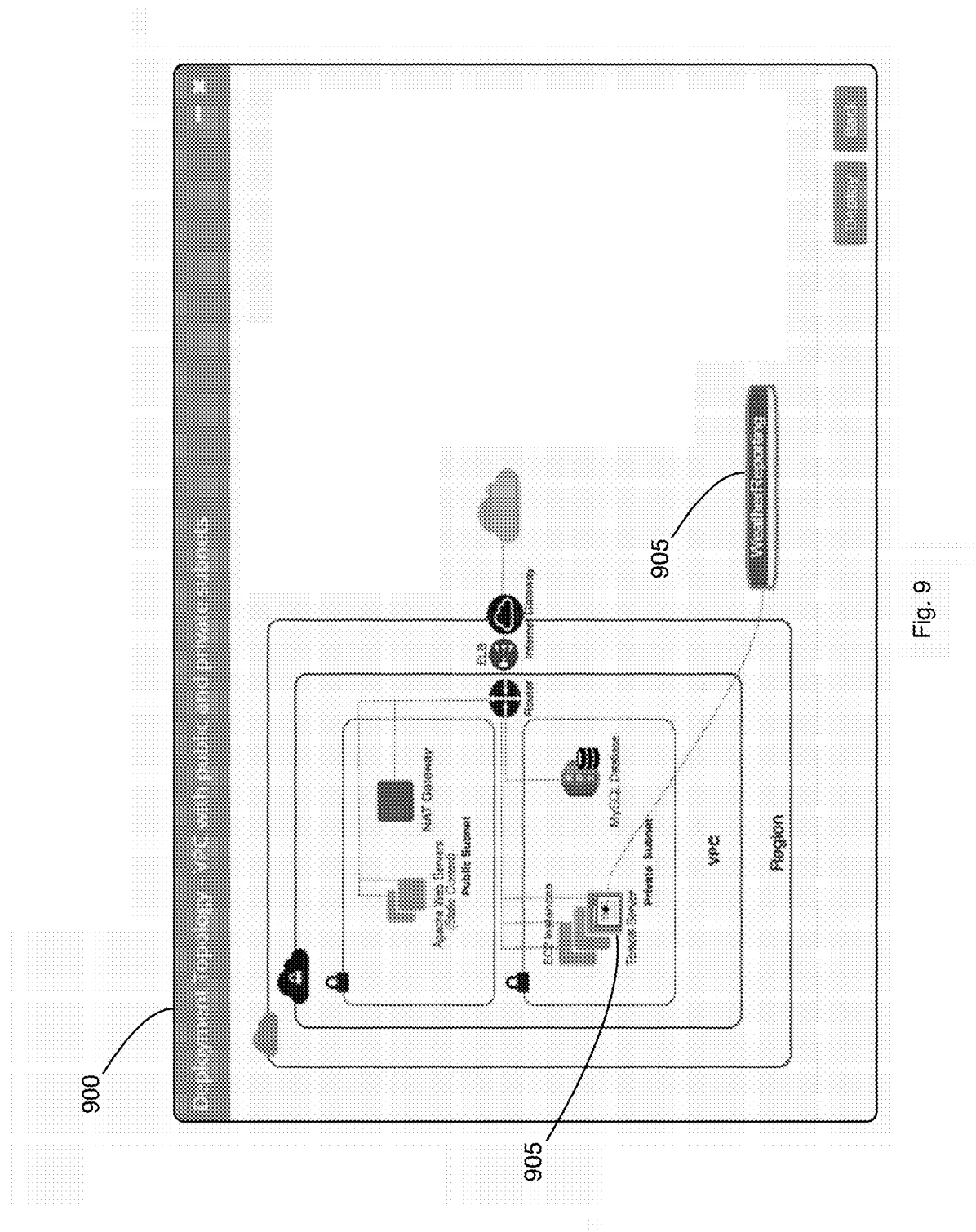
FIG. 9 illustrates an exemplary dialog box depicting details of a selected template choice.

Returning to FIG. 7A, selection of a preview button 735 may cause a dialog box depicting details of the selected template choice to be displayed, as illustrated in FIG. 9.

Referring to FIG. 9, in this case, the template selected by the user corresponds to a template that provides a VPC with both public and private network subnets. The application to be deployed corresponds to a weather reporting application 905. As illustrated, the dialog box 900 illustrates to the user the computer within the VPC that will host the weather reporting application 905, which in this case is a server 910 located within the private subnet.

Returning to FIG. 2, also, at block 225, the user selection may be added back to the training information at block 205. For example, as noted above in a post training phase, a user 118 of the decommissioning system 105 can agree with the assessment information 142 provided by the decommissioning system or select different migration options. In either case, the choice made by the user 118 is utilized by decommissioning system 105 to update the information in the training data store 107. For example, the application properties associated with the target application and the selections maid by the user regarding the cloud deployment may be added to the training data store 107 and therefore form the basis of future recommendations. As noted above, in this way, the decommissioning system 105 learns over time to make better assessments.

At block 230, the application may be deployed to the cloud system 115 based on the user's selection. For example, as illustrated in FIG. 7A, a deploy button 730 may be provided in dialog box 700 for causing the decommissioning system 105 to perform various deployment operations, as illustrated in FIG. 10.

Figure 10:
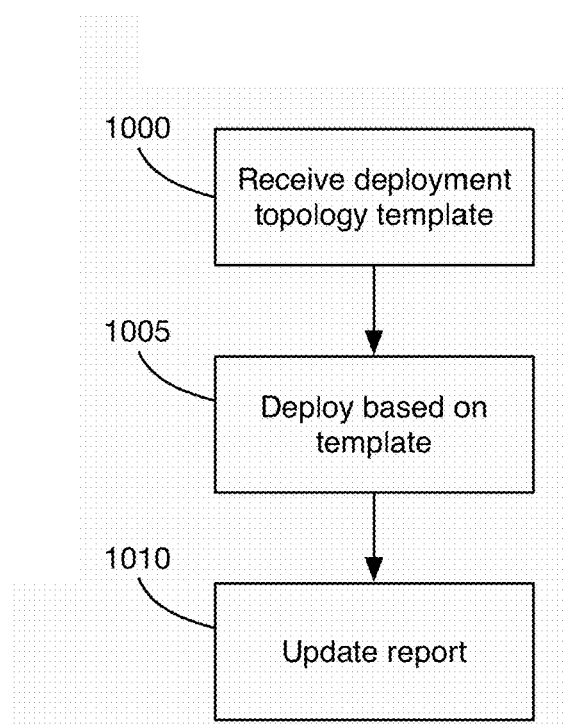
FIG. 10 illustrates exemplary operations that may be performed by the decommissioning system when deploying an application to a cloud computing system.

Referring to FIG. 10, at block 1000, the selected deployment template, cloud model, cloud solution, etc. may be received, for example, from the dialog box in FIG. 7A.

At block 1005, the decommissioning system 105 may communicate with the cloud computing system 115 via, for example, a web services interface, instructions to have the cloud computing system 115 generate the desired template and cloud model on the cloud computing system 115.

In some implementations, the decommissioning system 105 may also copy the application directly to the cloud computing system and prepare one or more databases, or other storage locations on the cloud computing system 115 for receiving data required by the application. For example, DevOps scripts may be generated to automated the deployment of the application to the cloud computing system 115. A user may then transfer the data from the current store location to the store location on the cloud computing system 115.

At block 1010, the decommissioning system 105 may update the cloud migration status column 615 in the exemplary report shown in FIG. 6 to indicate that the application is ready to be deployed or deployed.

Figure 11:
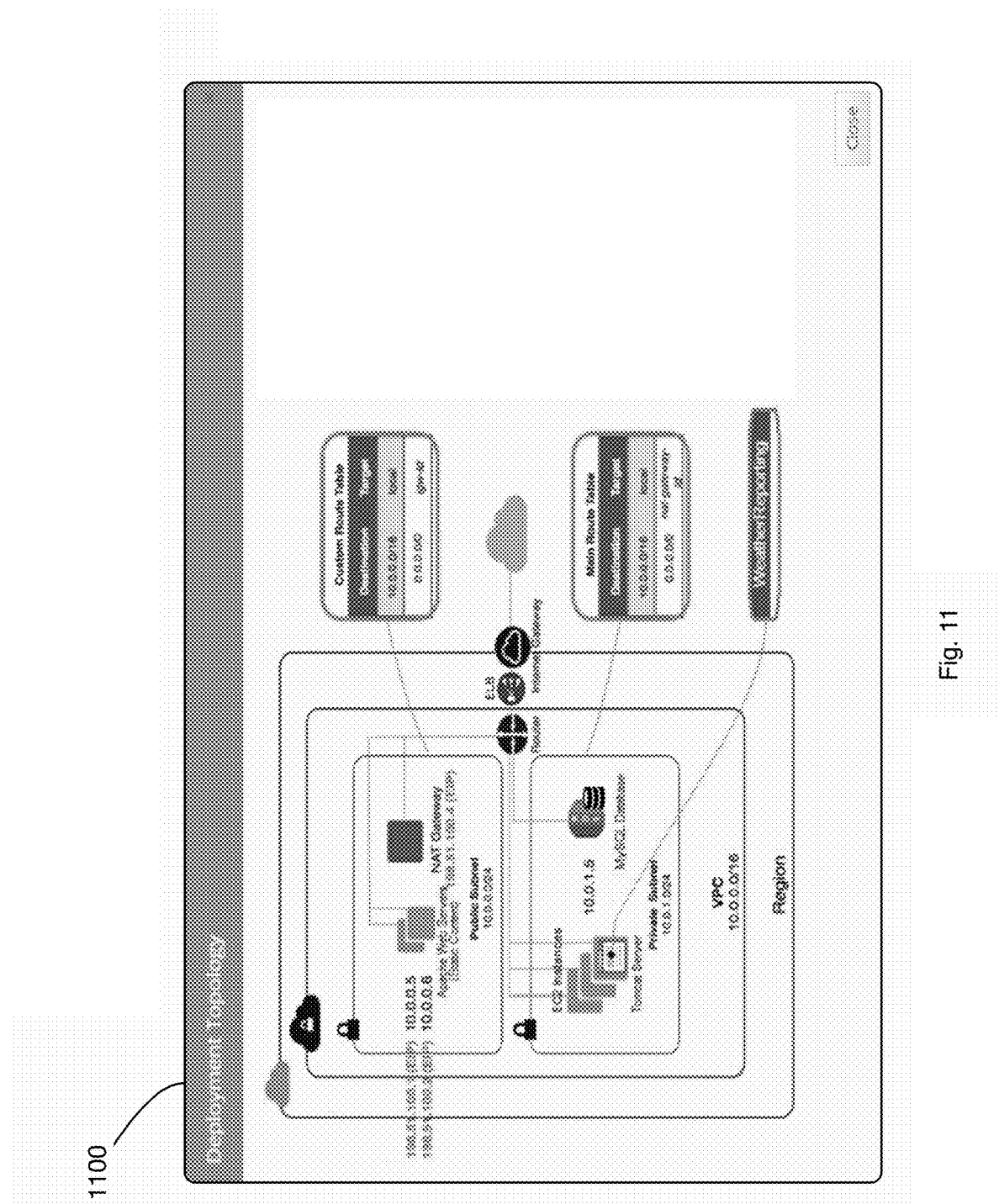
FIG. 11 illustrates an exemplary dialog box depicting various parameters associated with the deployment of a cloud solution.

In some implementations, subsequent to the deployment to the operations above, decommissioning system 105 may display a dialog box 1100 that displays various parameters associated with the deployment, as illustrated in FIG. 11. Referring to FIG. 11, the dialog box may display actual Internet address allocated to the application. For example, the VPC base IP address and the public subnet address may be set to 10.0.0.0. The private subnet address may be set to 10.0.1.0. An elastic IP address (EIP) for allowing outside parties access to the public subnet may be set to 198.51.100.1 and 198.51.100.2 to facilitate third party access to a pair of servers allocated within the public subnet of the VPC. Other information displayed may include various route tables.

Once the deployment topology has been created, a user of the decommissioning system 105 may take the necessary steps to transfer the application, if not already deployed, and its associated data to the cloud computing system 115. The user may then take the necessary steps to decommission the application from the server 110 from where the application was previously hosted. In some instances, if all applications are decommissioned from a given server 110, the server 110 itself may be decommissioned. That is, the equipment associate with the server 110 may be taken off line, sold, etc.

Figure 12:
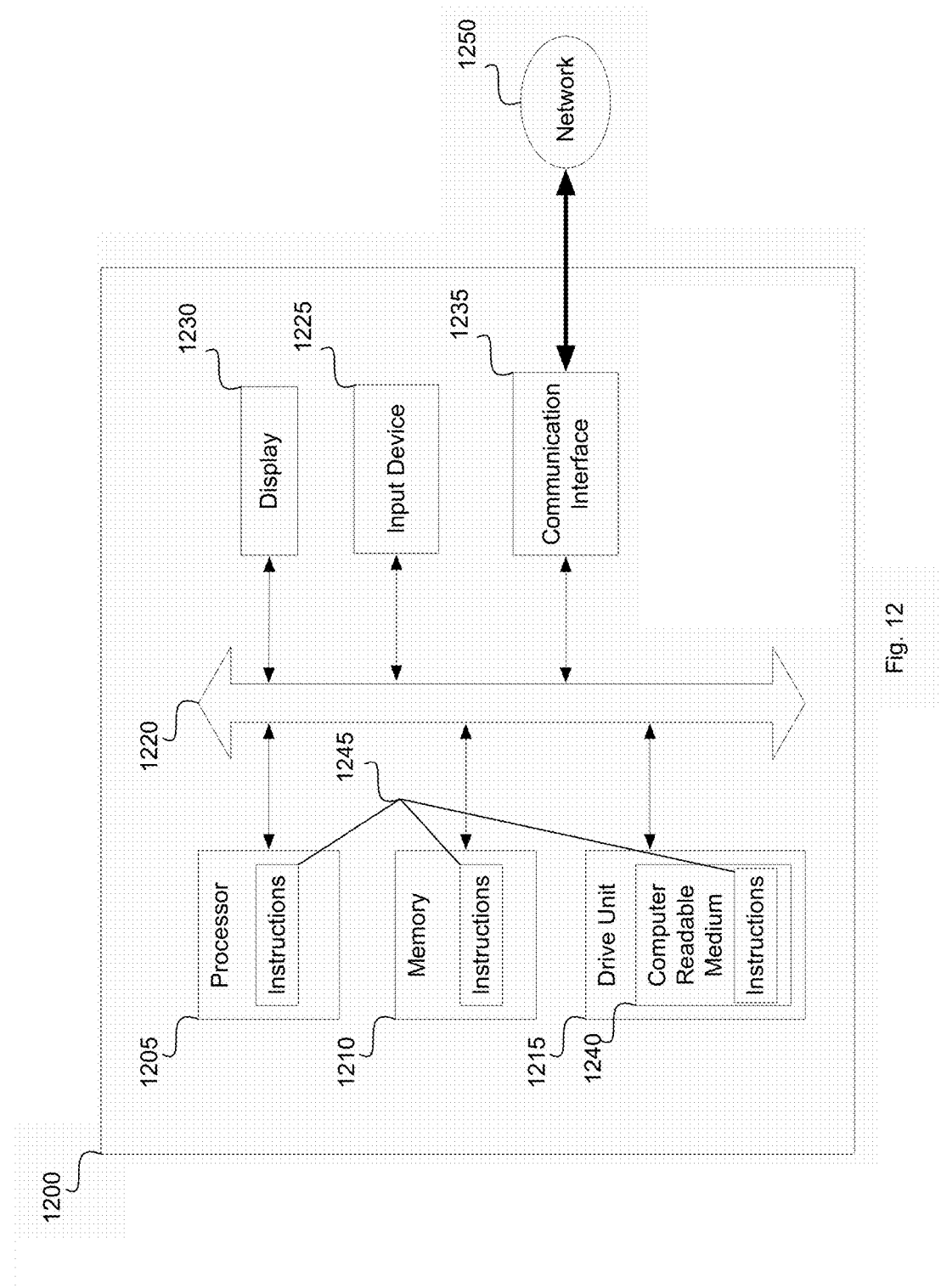
FIG. 12 illustrates a computer system that may correspond to one or more systems described above.

FIG. 12 illustrates a computer system 1200 that may form part of or implement the systems described above. The computer system 1200 may include a set of instructions 1245 that the processor 1205 may execute to cause the computer system 1200 to perform any of the operations described above. The computer system 1200 may operate as a stand-alone device or may be connected, e.g., using a network, to other computer systems or peripheral devices.

In a networked deployment, the computer system 1200 may operate in the capacity of a server or as a client-user computer in a server-client user network environment, or as a peer computer system in a peer-to-peer (or distributed) network environment. The computer system 1200 may also be implemented as or incorporated into various devices, such as a personal computer or a mobile device, capable of executing the instructions 1245 (sequential or otherwise) that specify actions to be taken by that machine. Further, each of the systems described may include any collection of sub-systems that individually or jointly execute a set, or multiple sets, of instructions to perform one or more computer functions.

The computer system 1200 may include one or more memory devices 1210 on a bus 1220 for communicating information. In addition, code operable to cause the computer system to perform any of the operations described above may be stored in the memory 1210. The memory 1210 may be a random-access memory, read-only memory, programmable memory, hard disk drive or any other type of memory or storage device.

The computer system 1200 may include a display 1230, such as a liquid crystal display (LCD), a cathode ray tube (CRT), or any other display suitable for conveying information. The display 1230 may act as an interface for the user to see the functioning of the processor 1205, or specifically as an interface with the software stored in the memory 1210 or in the drive unit 1215.

Additionally, the computer system 1200 may include an input device 1225, such as a keyboard or mouse, configured to allow a user to interact with any of the components of system 1200.

The computer system 1200 may also include a disk or optical drive unit 1215. The disk drive unit 1215 may include a computer-readable medium 1240 in which the instructions 1245 may be stored. The instructions 1245 may reside completely, or at least partially, within the memory 1210 and/or within the processor 1205 during execution by the computer system 1200. The memory 1210 and the processor 1205 also may include computer-readable media as discussed above.

The computer system 1200 may include a communication interface 1235 to support communications via a network 1250. The network 1250 may include wired networks, wireless networks, or combinations thereof. The communication interface 1235 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. For example, in some implementations, a virtual agent may be provided to a user of the tool make the correct selections. The virtual agent can correspond with the user over voice and answer questions directly. For this the virtual agent captures the voice and then searches the database for matching answers using artificial intelligent/learning algorithms similar to those describe above. On locating the best fit answer, the virtual agent provides a voice response. This is useful in cases where the users are globally dispersed and therefore can leverage the virtual agent instead of a physical SME. Also, since the virtual agent is in real time able to access and search a vast database comprising of information globally across a firm's data centers, the virtual agent's responses are likely to be more accurate and with quicker turnaround thereby driving up user experience.

Other modification may be made. For example, the decommissioning system may be configured to send notifications (i.e., emails, text messages, etc.) to stakeholders pertaining to various stages of the decommissioning and cloud migration process, such as "Being Assessed", "Ready to Deploy", "Deployed," etc. The notifications could also provide other status updates, escalations, alerts, approval notices, reverse sign off mailers etc.

In this regard, the decommissioning system may be configured to request approvals/reverse sign offs etc. from various stakeholders related to a particular application. For example, the decommission system may request approval before moving to a next operation of FIG. 2. These approvals and signoffs could be coordinated with a calendar tracking operation of the decommission system. For example, if an approval for proceeding to a next operation is not received by a certain date, a notification to alert one or more stakeholders associated with a given application may be communicated to the stakeholders. The calendar and tracking aspect may also allow the various stakeholders to get a comprehensive view of the overall project status and take remedial measures as appropriate. For example, a graphical depiction of a calendar or timeline view associated with the assessment and migration of a given application may be provided to provide a visual representation of the status.

In addition, as will be appreciated, the embodiments may be adapted to address not only decommissioning of technology systems but also of their associated business processes. For example, if the embodiments recommend moving an application to the cloud, the embodiments may be adapted to facilitate migration & modification of the associated business process to meet the new requirement using approached similar to those described above.

Further, the embodiments may assess the quantity of data currently residing in a given system for which applications are to be migrated, and recommend modes and methods of migration of data or archival of data using offline or near real time storage medium as appropriate.

Many other modifications may be made to adapt a particular situation to the teachings without departing from its scope. Therefore, it is intended that the present methods and systems not be limited to the particular embodiment disclosed, but that the disclosed methods and systems include all embodiments falling within the scope of the appended claims.

We claim:

1. A method for decommissioning an application operating on a computer system, the method comprising:
   receiving, at a decommissioning system, information that specifies a server to analyze;
   determining, by the decommissioning system, a target application operating on the server;
   determining, by machine learning logic, one or more applications deployed in a cloud computing system that are related to the target application based on properties of the one or more applications, wherein each of the one or more applications is associated with previously determined cloud deployment information that is stored in training data for training the machine learning logic to make the determination;

when the relatedness between at least one of the plurality of applications and the target application exceeds a threshold, determining that the target application is related to the at least one application of the plurality of applications; and generating a recommendation report to recommend that the target application be deployed to a cloud computing system according to the cloud deployment information associated with the at least one application of the plurality of applications, wherein the recommendation includes a schematic representation of a recommended deployment topology and a recommended deployment type that corresponds to one of a software as a service (SAAS), platform as a service (PAAS), and infrastructure as a service (IAAS) deployment type;

subsequently receiving a user selected deployment type; and when the user selected deployment type does not correspond to the recommended deployment type, updating the training data to associate the target application with the selected deployment type.

2. The method according to claim 1, further comprising:
receiving information that defines a business value associated with the target application, wherein if the business value is below a threshold and if the target application is determined to not be suitable for migration to the cloud computing system, indicating on the report that the application should be decommissioned.

3. The method according to claim 1, wherein determining a target application operating on the server further comprises:
installing a discovery tool on the server; and
executing the discovery tool, wherein the discovery tool is configured to identify applications operating on the server, and for each application, determine one or more instruction code libraries that are being utilized by the identified applications; and
determine hardware dependencies of the identified applications.

4. The method according to claim 1, wherein determining whether the application is suitable for migration to a cloud computing system further comprises:
determining one or more of: a number of users of the application, an amount of usage of the application, and hardware resources utilized by the application.

5. The method according to claim 1, wherein updating the training data further comprises:
associating the properties of the target application with the cloud deployment information selected by the user.

6. The method according to claim 1, wherein the cloud deployment information in the recommendation specifies a cloud service provider.

7. The method according to claim 6, wherein the cloud deployment information in the recommendation specifies a cloud computing template to be utilized when deploying an application to the cloud service provider.

8. The method according to claim 7, further comprising generating, by the decommissioning system, a cloud computing service using the specified cloud computing template with the specified cloud service, wherein after generation of the selected cloud computing service the application to be decommissioned is transferable to one or more data stores of the generated cloud computing service.

9. A system for decommissioning an application operating on a computer system or a computer system, the system comprising:
non-transitory computer readable media with instruction code; and
a processor, wherein based on the instruction code, the processor is configured to:
receive information that specifies a server to analyze;
determine a target application operating on the server;
implement machine learning logic to determine one or more applications deployed in a cloud computing system that are related to the target application based on properties of one or more applications, wherein each of the one or more applications is associated with previously determined cloud deployment information that is stored in training data for training the machine learning logic to make the determination;
when the relatedness between at least one of the plurality of applications and the target application exceeds a threshold, determine that the target application is related to the at least one application of the plurality of applications; and
generate a recommendation report to recommend that the target application be deployed to a cloud computing system according to the cloud deployment information associated with the at least one application of the plurality of applications, wherein the recommendation includes a schematic representation of a recommended deployment topology and a recommended deployment type that corresponds to one of a software as a service (SAAS), platform as a service (PAAS), and infrastructure as a service (IAAS) deployment type;
subsequently receive a user selected deployment type; and
when the user selected deployment type does not correspond to the recommended deployment type, update the training data to associate the target application with the selected deployment type.

10. The system according to claim 9, wherein the processor is further configured to:
receive information that defines a business value associated with the application, wherein if the business value is below a threshold and if the application is determined to not be suitable for migration to the cloud computing system, indicating on the report that the application should be decommissioned.

11. The system according to claim 9, wherein in determining one or more applications operating on the server, the processor is further configured to:
install a discovery tool on the server; and
cause the discovery tool to be executed on the server, wherein the discovery is configured to identify applications operating on the server, and for each application, determine one or more instruction code libraries that are being utilized by the identified applications; and determine hardware dependencies of the identified applications.

12. The system according to claim 9, wherein in determining whether the application is suitable for migration to a cloud computing system, the processor is further configured to:
determine one or more of: a number of users of the application, an amount of usage of the application, and hardware resources utilized by the application.

13. The system according to claim 9, wherein the processor is configured to:

associate the properties of the target application with the cloud deployment information selected by the user to thereby update the training data.

14. The system according to claim 9, wherein the cloud deployment information in the recommendation specifies a cloud service provider.

15. The system according to claim 14, wherein the cloud deployment information in the recommendation specifies a cloud computing template to be utilized when deploying an application to the cloud service provider.

16. The system according to claim 15, wherein the processor is further configured to generate a cloud computing service using the specified cloud computing template with the specified cloud service, wherein after generation of the selected cloud computing service the application to be decommissioned is transferable to one or more data stores of the generated cloud computing service.

17. A non-transitory computer readable medium having instruction code stored thereon for decommissioning an application operating on a computer system or a computer system, the instruction code being executable by a machine for causing the machine to perform acts comprising:
    receiving information that specifies a server to analyze;
    determining a target application operating on the server;
    determining, by machine learning logic, one or more applications deployed in a cloud computing system that are related to the target application based on properties of the one or more applications, wherein each of the one or more applications is associated with previously determined cloud deployment information that is stored in training data for training the machine learning logic to make the determination;
    when the relatedness between at least one of the plurality of applications and the target application exceeds a threshold, determining that the at least one application is related to the at least one application of the plurality of applications; and
    generating a recommendation report to recommend that the target application be deployed to a cloud computing system according to the cloud deployment information associated with the at least one application of the plurality of applications, wherein the recommendation includes a schematic representation of a recommended deployment topology and a recommended deployment type that corresponds to one of a software as a service (SAAS), platform as a service (PAAS), and infrastructure as a service (IAAS) deployment type;
    subsequently receiving a user selected deployment type; and
    when the user selected deployment type does not correspond to the recommended deployment type, updating the training data to associate the target application with the selected deployment type.

18. The non-transitory computer readable medium according to claim 17, wherein the instruction code is further executable to cause the machine to perform acts comprising:
    receiving information that defines a business value associated with the application, wherein if the business value is below a threshold and if the application is determined to not be suitable for migration to the cloud computing system, indicating on the report that the application should be decommissioned.

19. The non-transitory computer readable medium according to claim 17, wherein in determining one or more applications operating on the server, the instruction code is further executable to cause the machine to perform acts comprising further comprises:
    installing a discovery tool on the server; and
    executing the discovery tool, wherein the discovery tool is configured to identify applications operating on the server, and for each application, determine one or more instruction code libraries that are being utilized by the identified applications; and
    determine hardware dependencies of the identified applications.

20. The non-transitory computer readable medium according to claim 17, wherein in determining whether the application is suitable for migration to a cloud computing system, the instruction code is further executable to cause the machine to perform acts comprising:
    determining one or more of: a number of users of the application, an amount of usage of the application, and hardware resources utilized by the application.

21. The non-transitory computer readable medium according to claim 17, wherein the instruction code is further executable to cause the machine to perform acts comprising:
    associating the properties of the target application with the cloud deployment information selected by the user to thereby update the training data.

22. The non-transitory computer readable medium according to claim 17, wherein the cloud deployment information in the recommendation specifies a cloud service provider.

23. The non-transitory computer readable medium according to claim 22, wherein the cloud deployment information in the recommendation specifies a cloud computing template to be utilized when deploying an application to the cloud service provider.

24. The non-transitory computer readable medium according to claim 23, wherein the instruction code is further executable to cause the machine to perform acts comprising generating a cloud computing service using the specified cloud computing template with the specified cloud service, wherein after generation of the selected cloud computing service the application to be decommissioned is transferable to one or more data stores of the generated cloud computing service.

* * * * *